US007004480B2

(12) United States Patent
Trubiano

(10) Patent No.: US 7,004,480 B2
(45) Date of Patent: Feb. 28, 2006

(54) SHOPPING CART WITH ADVERTISING DISPLAY FRAMES AND ADVERTISING METHOD

(75) Inventor: Antoine Trubiano, Montreal (CA)

(73) Assignee: Cari-All Inc., Montreal (CA)

( * ) Notice: Subject to any disclaimer, the term of this patent is extended or adjusted under 35 U.S.C. 154(b) by 122 days.

(21) Appl. No.: 10/688,811

(22) Filed: Oct. 17, 2003

(65) Prior Publication Data

US 2004/0135330 A1    Jul. 15, 2004

Related U.S. Application Data

(63) Continuation-in-part of application No. 10/074,383, filed on Feb. 12, 2002, now abandoned.

(51) Int. Cl.
*B62B 3/14* (2006.01)
(52) U.S. Cl. .......................... 280/33.992; 280/DIG. 4; 40/308; 40/590
(58) Field of Classification Search ..............................
280/33.991–33.993, 33.997, 47.34, 47.38, 280/DIG. 4; 40/308, 590; D34/12, 27, 17, D34/19
See application file for complete search history.

(56) References Cited

U.S. PATENT DOCUMENTS

| 3,024,554 | A |  | 3/1962 | Kempher |
| 4,616,839 | A |  | 10/1986 | Trubiano |
| 4,632,411 | A |  | 12/1986 | Badger |
| 4,765,077 | A |  | 8/1988 | Rosenthal et al. |
| 4,773,175 | A |  | 9/1988 | Larsen |
| 4,922,639 | A |  | 5/1990 | Rehrig |
| 5,210,968 | A |  | 5/1993 | Rehrig |
| 5,289,936 | A |  | 3/1994 | Jones et al. |
| 5,306,033 | A |  | 4/1994 | Evans |
| 5,363,575 | A |  | 11/1994 | Sawyer et al. |
| D400,679 | S |  | 11/1998 | Kern et al. |
| 5,915,704 | A |  | 6/1999 | Segura de Luna |
| 2004/0216339 | A1 | * | 11/2004 | Garberg et al. ............... 40/308 |

FOREIGN PATENT DOCUMENTS

| DE | 3502791 | 7/1986 |
| EP | 0 222 480 | 5/1987 |
| EP | 0 323 766 | 7/1989 |
| EP | 0 340 358 | 11/1989 |
| EP | 0 341 029 | 11/1989 |
| FR | 2 556 117 | 6/1985 |
| GB | 2 231 432 | 11/1990 |
| WO | WO 93/02903 | 2/1993 |

\* cited by examiner

*Primary Examiner*—Jeff Restifo
(74) *Attorney, Agent, or Firm*—Carter, Schnedler & Monteith

(57) ABSTRACT

A metal wire rod shopping cart wherein a reinforced display frame is integrated in a wall of at least one of a front wall, opposed side walls or the backrest wall of a baby seat compartment. A metal panel sheet is secured substantially centrally in a U-shaped metal channel to divide the channel into opposed slots whereby to receive a promotional sheet having display material thereon. The reinforced display frame is welded to metal wire rods in the wall and lies in the plane of the wall to provide for non-obstruction when nesting said shopping cart with other like shopping carts and to reinforce the wall.

7 Claims, 6 Drawing Sheets

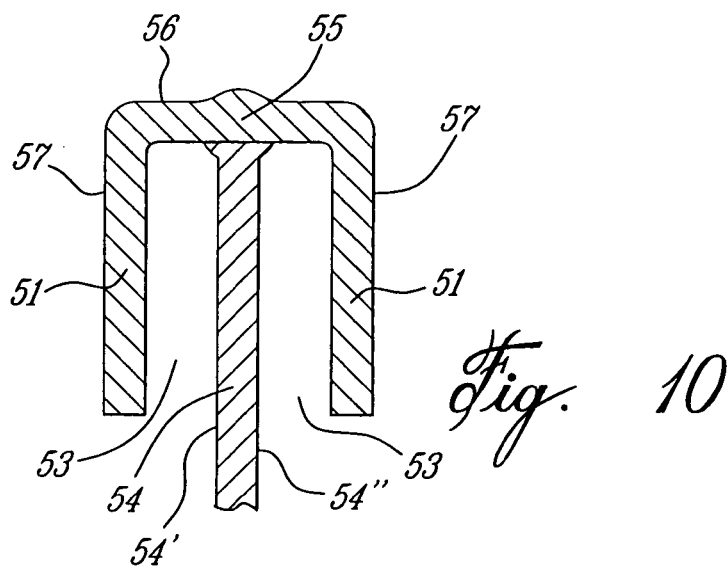
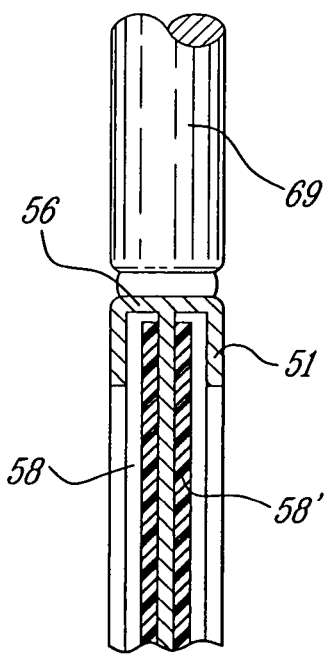
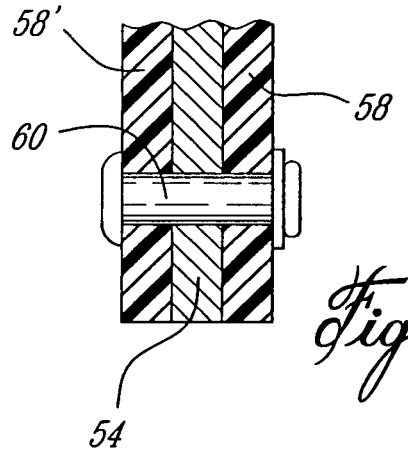
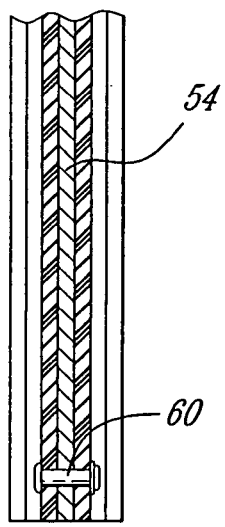

SHOPPING CART WITH ADVERTISING DISPLAY FRAMES AND ADVERTISING METHOD

CROSS-REFERENCE TO RELATED APPLICATION

This is a continuation-in-part of patent application Ser. No. 10/074,383, filed on Feb. 12, 2002 now abandoned and entitled "Shopping Cart with Advertising Display Frames And Business Method", that application being abandoned in favour of this continuation-in-part application.

TECHNICAL FIELD

The present invention relates to a shopping cart having advertising display frames on the side walls and/or front wall thereof whereby to carry promotional material which is visible to a user person and the advertising method wherein the promotional material generates additional income to a proprietor of the shopping cart by increasing sales and providing a payback of the shopping cart.

BACKGROUND ART

Heretofore shopping carts have been provided wherein a panel may be affixed to the outer surface of the front wall thereof to carry advertising material or simply a photograph or a design whereby to enhance the appearance of the shopping cart. Such material carried by such frame is however of a permanent nature. It is also known to fabricate shopping carts with plastic molded baskets and wherein on the side wall of the basket there is provided a small plaque which is usually rectangular in outline and which carries in a permanent embossed nature the name of the merchandising establishment or the name of the fabricator of the shopping cart. Accordingly, it has been known to display written material or advertisement on the outer surface of the front wall or side walls of a shopping cart basket but in most cases such has been provided for permanent display.

SUMMARY OF INVENTION

It is a feature of the present invention to provide an advertising method which includes a shopping cart and wherein one or more display frames are provided in the side walls and front wall of a shopping cart whereby to removably secure promotional advertisement in sheet form to increase the sale of a promotional product and to generate additional revenue to a proprietor of the shopping cart.

Another feature of the present invention is to provide a shopping cart for use with the above mentioned method and wherein a display frame is provided on the inner surfaces of the side walls of the shopping cart basket whereby advertising material removably securable to such frames are visible to a shopping person when standing to the side of the shopping cart and/or to the inner surface of the front wall of the basket whereby to make such advertising material visible to a user person pushing such cart from the rear end thereof.

Another feature of the present invention is to provide a shopping cart for use with an advertising method and wherein the display frames are provided on the inner and outer surfaces of both side walls and/or front wall of the shopping cart basket.

According to the above features, from a broad aspect, the present invention provides a metal wire rod shopping cart having an article carrying basket secured to a frame provided with casters. The basket has a bottom wall, opposed side walls, a front wall and a backrest wall of a baby seat compartment. The improvement resides in that at least one reinforced display frame is integrated in a wall of at least one of the front wall and opposed side walls. The reinforced display frame has a U-shaped metal channel defined by opposed parallel side channel members and an integral transverse end channel member disposed in a common plane. The channel members have longitudinal slots. A metal panel sheet is secured substantially centrally in said slots of at least said opposed parallel side channel members to divide the slots to form an outer and inner slot adjacent an outer and inner side wall of the metal panel sheet whereby to receive a promotional sheet having display material thereon in sliding fit over the outer and inner side walls between opposed parallel ones of the outer and inner slots. The channel member of the reinforced display frame is welded to metal wire rods in the said wall whereby the reinforced display frame lies in the plane of the side wall to provide for non-obstruction when nesting said shopping cart with other like shopping carts and to reinforce the side wall while providing a backing surface behind the promotional sheets.

According to a further broad aspect of the present invention there is provided a shopping cart having an articles carrying basket as above-described and for use in a business method as also above described.

According to a further broad aspect of the present invention the at least one display frame is provided on the inner surface of the opposed side walls of the shopping cart basket and/or of the front wall.

BRIEF DESCRIPTION OF DRAWINGS

A preferred embodiment of the present invention will now be described with reference to the accompanying drawings in which:

FIG. 10 is an enlarged section view, partly fragmented, showing the construction of the U-shaped frame;

FIG. 11 is a fragmented section view showing the U-shaped frame connected to the backrest wall of the baby seat compartment and in which are secured opposed promotional sheets; and FIG. 12 is a fragmented section view showing how the promotional sheets are secured to the metal panel sheet of the reinforced display frame.

DESCRIPTION OF PREFERRED EMBODIMENTS

Figure 1:
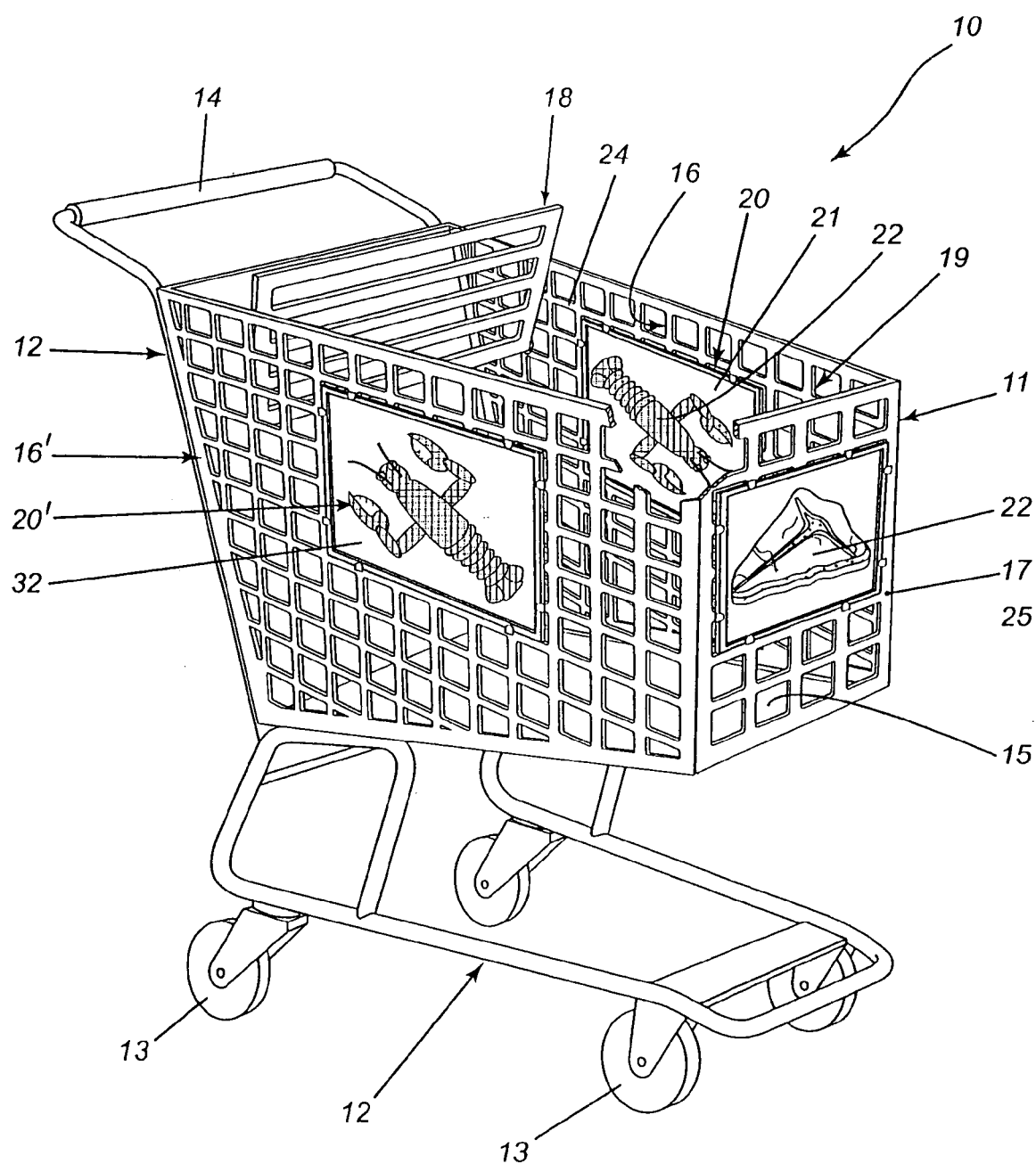
FIG. 1 is a fragmented perspective view of a shopping cart provided with advertising display frames for use in an advertising method of the present invention.

Referring now to the drawings and more particularly to FIG. 1, there is shown generally at 10 a shopping cart of common construction and wherein a shopping cart basket 11 is secured to a support frame 12 mounted on casters 13 whereby to displace the shopping cart over a floor surface by means of a handle bar 14 secured to the frame 12 or formed integrally thereof and located rearwardly of a shopping cart. The shopping cart basket 11 has a bottom wall 15, opposed side walls 16, a front wall 17, a rear gate assembly 18 and an open top end 19. During use, the shopping cart is pushed by a user person through aisles in a shopping establishment and articles are placed into the basket 11 as is well known in the art.

Figure 2:
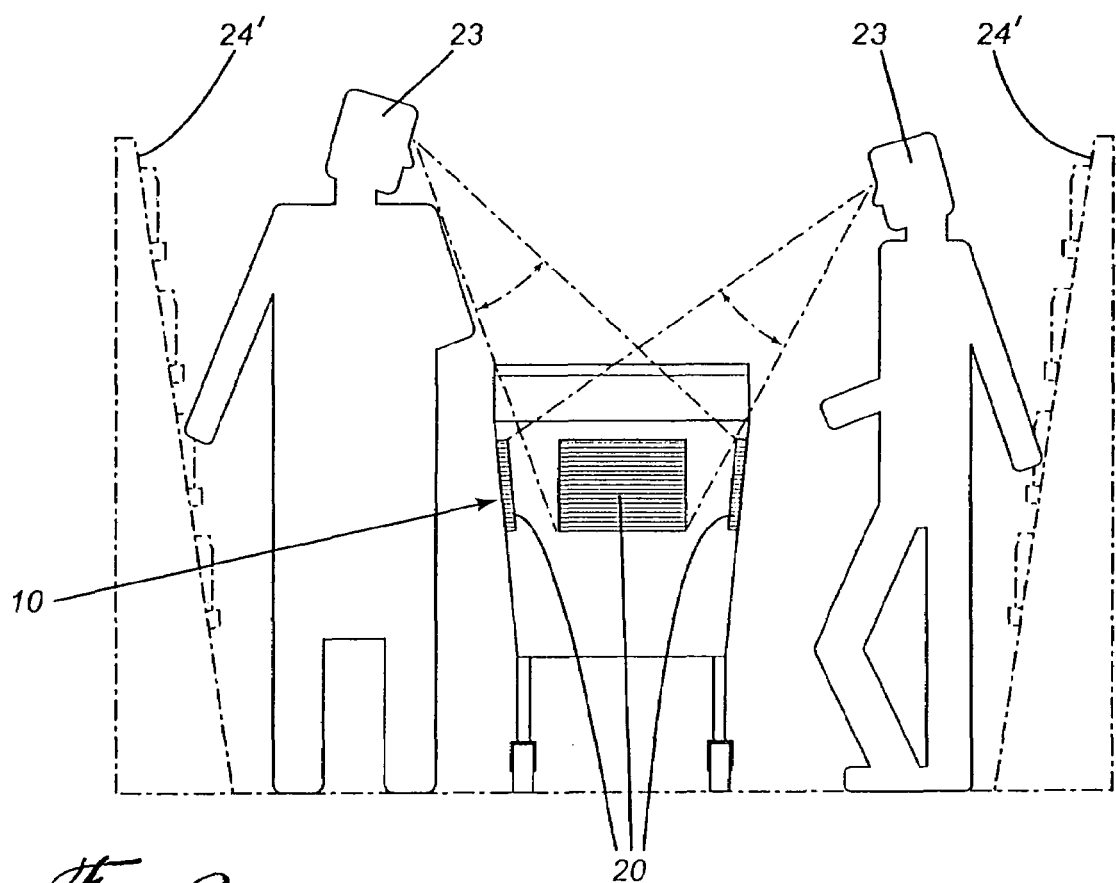
FIG. 2 is a simplified schematic view illustrating how a user person has access to the advertising material which is removably secured to the display frames located on the inner surface of the side walls of the shopping cart basket of the present invention.
Figure 3:
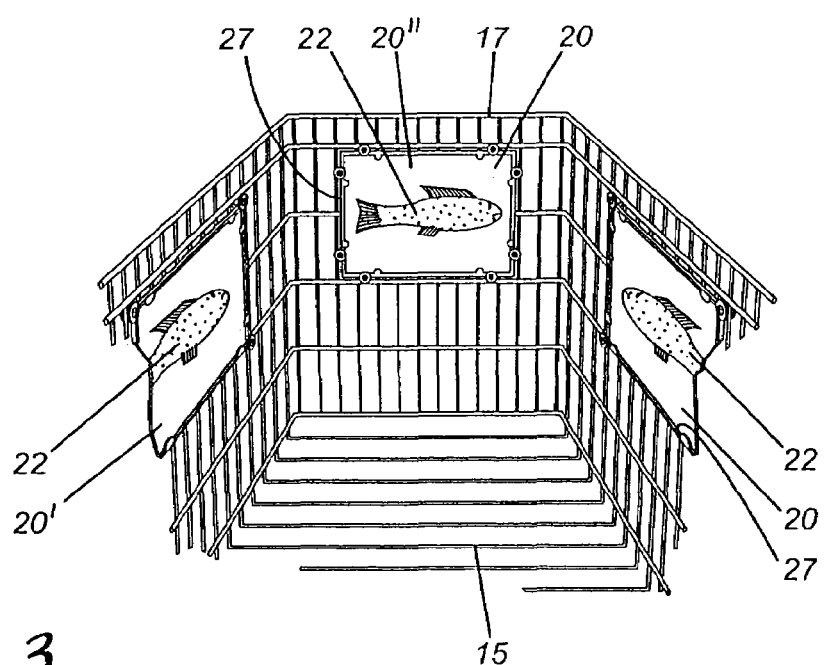
FIG. 3 is a fragmented view of the shopping cart basket showing the position of a display frame on the inner surface of the front wall of the shopping cart basket.

The present invention provides an advertising method wherein the shopping cart is provided with at least one display frame 20 secured to a surface of at least one of the front wall 17 or opposed side walls 16 and 16'. As hereinshown, the display frame 20 and 20' is provided in the opposed side walls 16 and 16'. A promotional sheet 21 is secured to the display frame 20 and carries display material 22 thereon. As shown in this Figure, the display material is a lobster photograph or design whereby to suggest to a user person to buy such a product or seafood products. The frame 20 is also secured to the inner surface 24 of a side wall 16 and visible from the side of the shopping cart 10 as is illustrated with further reference to FIG. 2. As can be seen in FIG. 2, the user person 23 has access to the display frame when the shopping cart is in use by a user person and the user person is retrieving products from the shelving 24' to the side of the shopping cart and this, from both sides of the shopping cart.

The display material 22 on the frame 20 facing inwardly of the shopping cart basket may be different from the display material on the frame 20' on the opposed side wall and facing inwardly of the basket as the present invention provides for deriving revenue from such display material. Accordingly, the promotional sheet is provided as a removably attachable sheet to change the advertisement.

Figure 5:
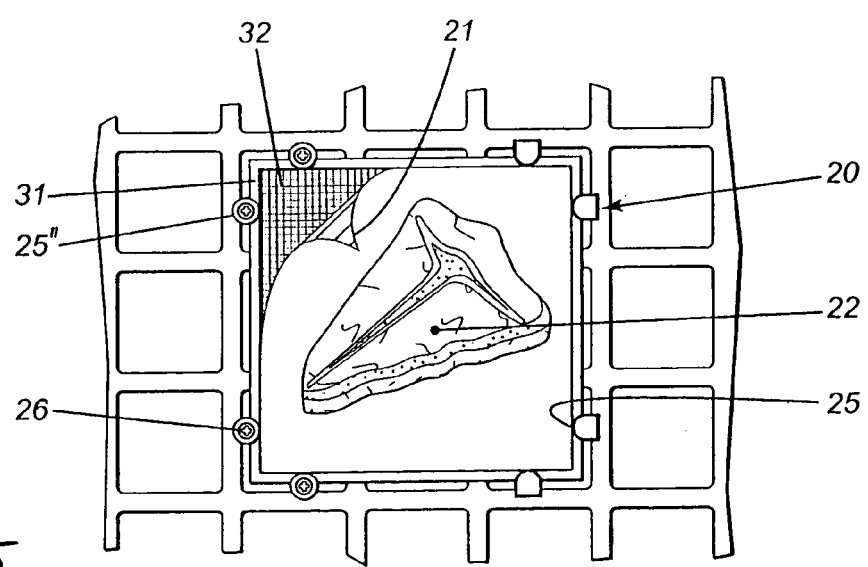
FIG. 5 is a fragmented view showing the construction of a display frame and the manner in which a promotional sheet is detachably secured to the frame.
Figures 6, 7:
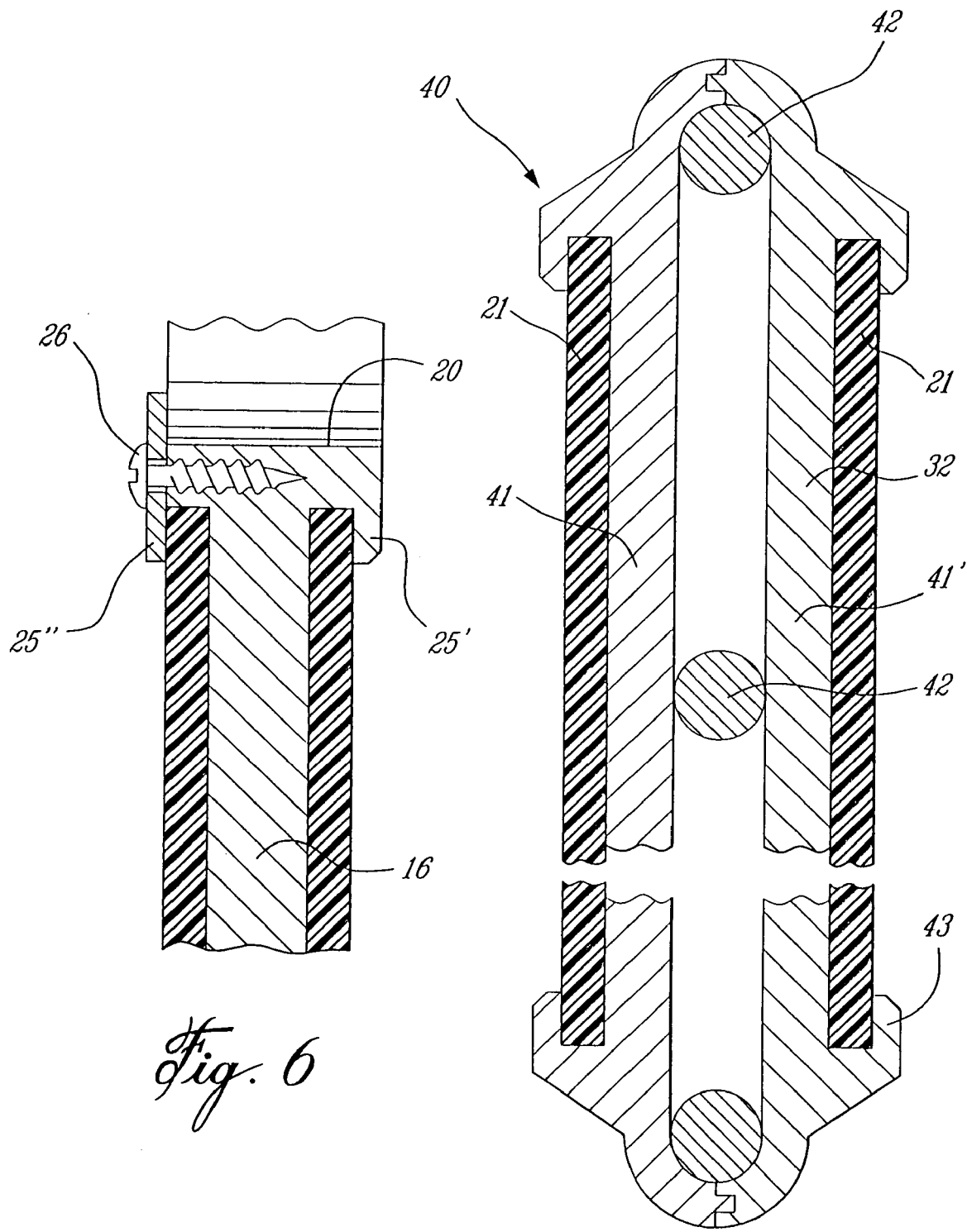
FIG. 6 is a fragmented section view through a display frame formed in the side walls or front wall of a shopping cart basket constructed in accordance with the present invention.
FIG. 7 is a side view showing a display frame which is secured to the wire rods of a shopping cart basket and providing for the removable securement of promotional sheet material both internally and externally of the shopping cart wall.

Referring to FIGS. 5 and 6, it can be seen that the frame 20 is provided with attachment means 25 in the form of integrally formed flanges 25'. These flanges are formed with the side wall 16 which is hereinshown in FIG. 6 as being constituted by an injected molded basket side wall 16. The attachment means 25 is hereinshown as washers 25" which are secured about the frame 20 by fasteners 26 and as is shown in FIG. 5, the promotional sheet 21 is simply positioned under these flanges 25' or washers 25" whereby they can be easily removed and replaced. Therefore, the sheet has rigidity such as a plastic laminated advertising sheet. The sheets 21 are also preferably formed of waterproof material such as plastic sheets that can retain an image or written and printed material and resistant to wear by product placed thereagainst. By providing an advertising image and/or written material on the promotional sheet, sales of the promotional product are generally increased, as these are continuously visible to the user of the shopping cart and suggestive of a product or products. With the present invention it is intended that such advertising material be sold for predetermined periods of time at a chargeable rate whereby the advertising sheet or panels can be changed after the predetermined period of time has lapsed. The advertising cost can also vary depending on festive seasons, such as holiday periods. Also, when leasing the advertisement, such cost can vary dependent on the quantity of shopping carts equipped with a customer's advertisement. Thus, the carts can advertise several products at the same time.

The advertising method also comprises the provision of a frame 20" over the inner surface 27 of the front wall 17 of the shopping cart whereby the advertising display material 22 is visible from a user person standing rearwardly of the shopping cart 10, such as when pushing the cart, or to the sides thereof when filling the cart basket with goods. In this position the advertising material is usually always visible to the user person as well as the material on the side frames 20 and 20'. Accordingly, display material can be provided on both the inner surface of the side walls and the front wall and the display material can be for various predetermined periods of time. Therefore, the promotional sheet material inside the shopping cart may be different on the side walls and the front wall.

Figure 4:
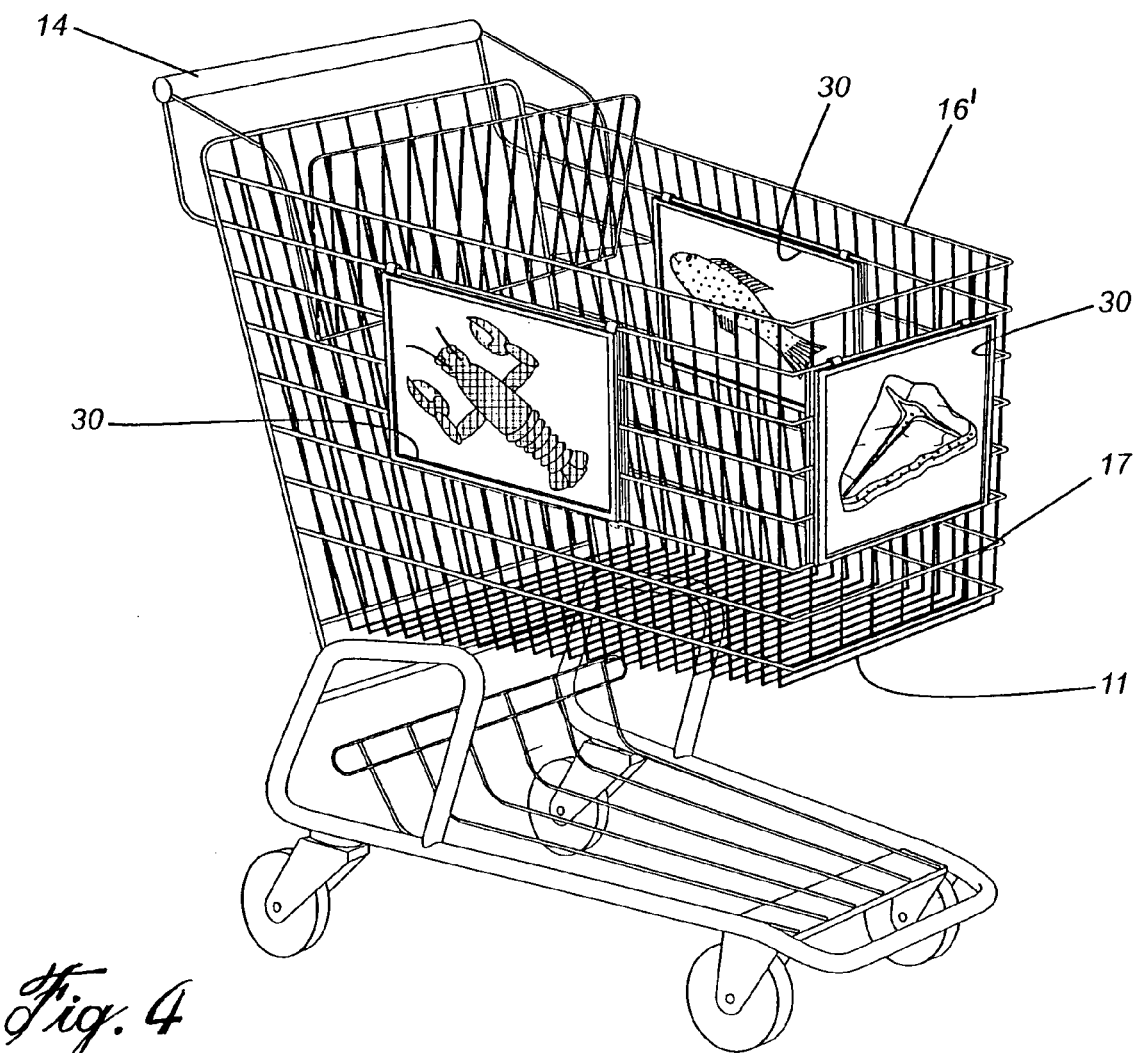
FIG. 4 is a perspective view of a shopping cart basket constructed in accordance with the present invention and wherein display frames are provided on the outer surfaces of the side wall and front wall of the basket.

As shown in FIG. 4, additional display frames 30 may be provided on the outer surfaces of the side walls 16 and 16' and the front wall 17 and in registry with the frames on the inner surfaces of these walls to provide additional promotional sheet materials on the outer surfaces. This is visible to other persons in a shopping establishment. It is also conceivable that more than one display frame could be provided on either or both the inner and outer surfaces of the side walls and front wall of the shopping cart basket.

As shown in FIGS. 4, 5 and 6, the basket is an injected plastic molded basket and the frames have a contour wall 31 and a flat rear panel 32. Therefore, it is conceivable that the advertising sheet material 21 could be adhesively secured to the panels 32 with a peelable adhesive or with other types of adhesives that facilitate the interchangeability of these promotional sheets 21.

Referring now to FIG. 7, there is shown a further construction of a display frame 40 wherein the display frame is formed in two sections 41 and 41' which are clampingly secured to a side wall or front wall of a wire-type basket which is constructed of wire rods 42. The frame sections 41 and 41' are clamped together by a suitable means not shown but obvious to a person skilled in the art. Accordingly, one section 41 lies over the outer side of the shopping cart basket wherein the section 41' is over the inside surface of the shopping cart side walls or front wall. These sections are also provided with flanges or other attachment means 43 to secure the promotional sheets 21 thereto.

Referring now to FIGS. 8 to 12, there will be described a preferred embodiment of the present invention and wherein the display frame is a reinforced display frame 50 having a generally U-shaped construction and defined by opposed parallel side channels 51 and 51' and an integral transverse end channel 52. The channels are disposed in a common plane whereby to form a narrow U-shaped metal frame. With further reference to FIG. 10, it can be seen that the side channel members 51 and 51' are of U-shaped cross-section and define longitudinal parallel slots 53. A metal panel sheet 54 is secured substantially centrally in the slots, as shown in FIG. 10, by spot welds 55 or a longitudinal weld with the top wall 56 of the channel members.

The metal panel sheet 54 may be secured only across the opposed parallel side channel members 51 and 51' or to all channel members. This metal panel sheet divides the slots 53 to form an outer slot 53 and an inner slot 53' adjacent an outer and an inner side wall 57 and 57' of the channel members.

Figure 8:
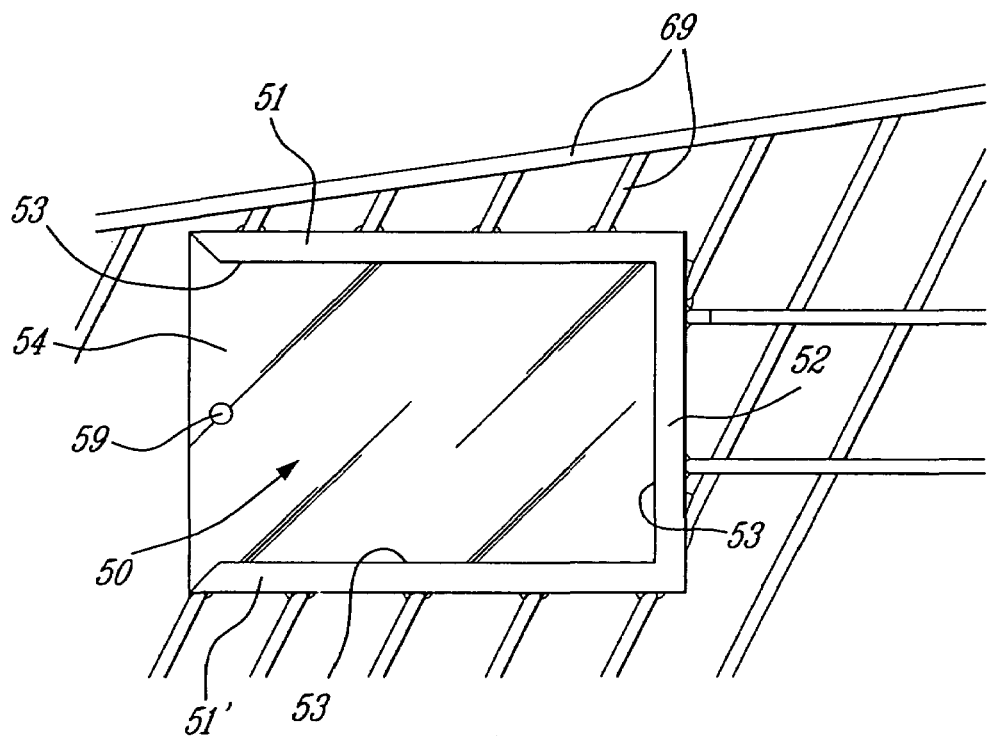
FIG. 8 is a fragmented side view showing the reinforced display frame of the present invention secured to a side wall portion of a shopping cart.
Figure 9:
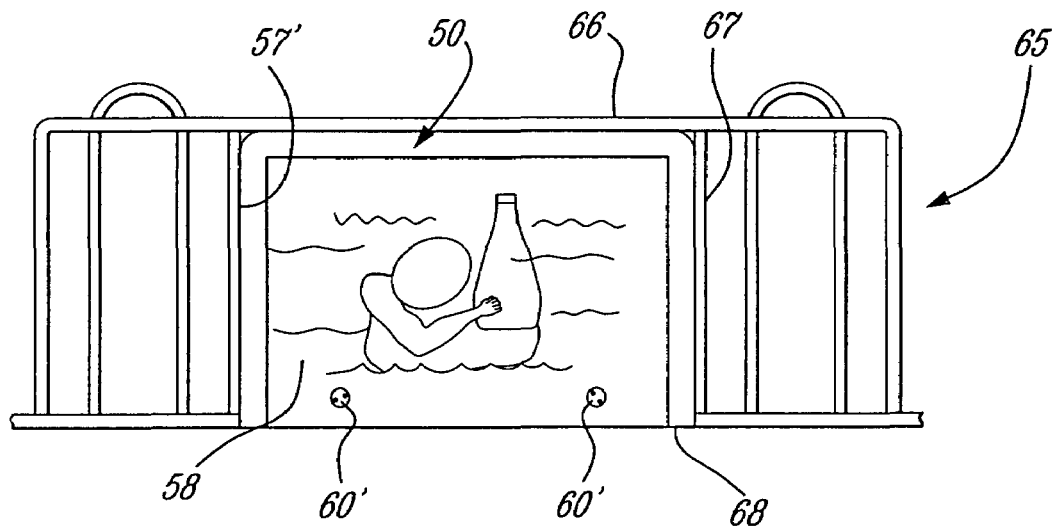
FIG. 9 is a plan view showing the reinforced display frame of the present invention secured to the backrest wall of the baby seat compartment.

As shown in FIGS. 9 and 11, a promotional sheet, preferably a laminated plastic sheet 58, can be slidingly received between the slots of the opposed parallel side channel members 51 and 51' and extend into the transverse end channel 52 whereby to display promotional material on both sides of the reinforced display frame. These sheets are received in sliding fit over the inner side wall 54' and outer side wall 54" of the metal panel sheet 54 which provides a rigid backing support for the display panels. As shown in FIG. 8, a fastener receiving hole 59 is provided in the metal panel sheet 54 whereby to receive a fastener, such as fastener 60, shown in FIG. 12, which extends through corresponding holes in the promotional sheets 58 and 58' and aligned with the hole 59 in the metal panel whereby to secure the promotional sheet within the frame.

It is pointed out that the reinforced display frame 50 is a narrow reinforced steel frame and which has a width no greater than the width of the wire rods 69, as shown in FIG. 11, whereby it is integrated within the thickness of the wire rod construction of the shopping cart walls to which it is secured. The frame is located within the plane of the walls of the shopping cart to provide for re-inforcement of the walls. As hereinshown the wire rods of the sidewall are welded to the frame. Also, the reinforced display frame allows for the shopping cart to be nested with other shopping carts without obstruction or damaging of the outer promotional sheet.

It is pointed out that the reinforced display frame may have different sizes whereby to fit aesthetically within the side walls, front wall or backrest of a baby seat compartment of a shopping cart. FIG. 9 illustrates a backrest 65 of a baby seat compartment of a shopping cart, also constructed of wire rods and wherein the reinforced display frame 50 is integrated thereto and welded to the horizontal top wire rod 66 and to opposed side rods 67 and 67'. The open end of the frame 50 is now located downwardly as designated by reference numeral 68 and therefore the promotional sheets are inserted from the bottom and slid up into the frame. The metal panel sheet as hereinshown is provided with two holes therein whereby to receive a pair of fasteners 60' to secure the promotional sheets to the front and back of the backrest 65. FIG. 11 illustrates how the reinforced display frame is integrated in a side wall of the shopping cart and as hereinshown the channel members 51 are dimensioned to be substantially of the same width as the wire rods 69. The reinforced display frame is also preferably constructed entirely of stainless steel for hygienic purpose, longevity and strength.

Accordingly, the present invention provides an advertising method whereby to generate additional revenue to a proprietor of the shopping cart by increasing sales and providing a payback to the proprietor of the shopping cart thereby facilitating the sale of shopping carts having display frames strategically located to generate additional revenue.

It is within the ambit of the present invention to cover any obvious modifications of the preferred embodiment described herein provided such modifications fall within the scope of the appended claims.

I claim:

1. In a metal wire rod shopping cart having an article carrying basket secured to a frame provided with casters; said basket having a bottom wall, opposed side walls, a front wall, and a backrest wall of a baby seat compartment; the improvement comprising providing at least one reinforced display frame integrated in a wall of at least one of said front wall and opposed side walls; said reinforced display frame having a U-shaped metal channel defined by opposed parallel side channel members and an integral transverse end channel member disposed in a common plane, said channel members having longitudinal slots, a metal panel sheet secured substantially centrally in said slots of at least said opposed parallel side channel members to divide said slots to form an outer and inner slot adjacent an outer and inner side wall of said metal panel sheet to receive a promotional sheet having display material thereon in sliding fit over said outer and inner side wall between opposed parallel ones of said outer and inner slots, said channel members of said reinforced display frame being welded to metal wire rods in at least one of said walls whereby said reinforced display frame lies in the plane of at least one of said walls to provide for non-obstruction when nesting said shopping cart with other like shopping carts and to reinforce at least one of said walls and providing a backing surface behind said promotional sheets.

2. A shopping cart as claimed in claim 1 wherein there is further provided fastener means extending through a promotional sheet disposed over said outer and inner side wall and said metal panel sheet to removably secure said sheets.

3. A shopping cart as claimed in claim 1 wherein said U-shaped metal channel and said metal panel sheet are constructed of steel.

4. A shopping cart as claimed in claim 1 wherein said display material contains an imagery and/or written material of promotional content to increase the sale of a promotional product which is displayed or described on said sheet and for a predetermined period of time, said display frame being provided in said opposed side walls of said basket, said promotional sheet in both display frames being adapted to be replaced after a predetermined period of time and being visible from a respective side of said basket.

5. A shopping cart as claimed in claim 1 wherein said display frame is also provided in said front wall of said basket with said promotional sheets being visible from the rear of said basket and opposed sides thereof.

6. A shopping cart as claimed in claim 1 in combination with an advertising method wherein there is provided the steps of (a) providing a chargeable rate for the placement of said promotional sheets in said display frame during said predetermined period of time, (b) providing a further chargeable rate for predetermined quantities of shopping carts provided with the promotional sheets of step (a).

7. A shopping cart as claimed in claim 6 wherein said display material is constituted by images of products associated with a merchandising enterprise, said promotional sheet being fabricated as a waterproof promotional sheet.

* * * * *